United States Patent
Yuan et al.

(10) Patent No.: US 11,809,583 B2
(45) Date of Patent: Nov. 7, 2023

(54) MINIMIZING DATA EXPOSURE DURING SCREEN SHARING

(71) Applicant: Dell Products L.P., Round Rock, TX (US)

(72) Inventors: Zheng Yuan, Austin, TX (US); Danilo Ong Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 17/314,332

(22) Filed: May 7, 2021

(65) Prior Publication Data

US 2022/0358232 A1    Nov. 10, 2022

(51) Int. Cl.
*G06F 21/62*    (2013.01)
*G06F 21/84*    (2013.01)

(52) U.S. Cl.
CPC .......... *G06F 21/6218* (2013.01); *G06F 21/84* (2013.01)

(58) Field of Classification Search
CPC ..... G06F 21/6218; G06F 21/84; G06F 21/629
See application file for complete search history.

(56) References Cited

U.S. PATENT DOCUMENTS

| | | | | |
|---|---|---|---|---|
| 5,550,968 A | * | 8/1996 | Miller | G06F 21/84 715/741 |
| 2003/0046548 A1 | * | 3/2003 | Brown | G06F 21/10 713/182 |
| 2005/0078082 A1 | * | 4/2005 | Muralidharan | A61B 6/548 345/156 |
| 2008/0091791 A1 | * | 4/2008 | Cardarelli | H04L 41/069 709/217 |

* cited by examiner

*Primary Examiner* — Han Yang
(74) *Attorney, Agent, or Firm* — McDermott Will & Emery LLP (57) ABSTRACT

Minimizing data exposure during screen sharing, including detecting remote access of an information handling system by an external information handling system; in response to detecting the remote access, identifying a selection of one or more application elements of an application executing on the information handling system for obscuration; applying an image filter to the selected application elements to adjust display properties of the selected application elements such that display content of the application elements is obscured for viewing by the external information handling system; and after applying the image filter to the selected application elements, providing remote access of the information handling system to the external information handling system, including providing remote access to the obscured display content of the selected application elements of the application.

18 Claims, 6 Drawing Sheets

MINIMIZING DATA EXPOSURE DURING SCREEN SHARING

BACKGROUND

Field of the Disclosure

The disclosure relates generally to an information handling system, and in particular, minimizing data exposure during screen sharing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is common in a corporate environment that a user may need IT personnel to remotely diagnose and remediate issues of an information handling system that the user is working on. Typically, IT personnel requests and obtains control over the user's information handling system and can directly manipulate the desktop of the information handling system, and applications of the information handling system. In the case of debugging of software applications, e.g., an email client, emails may be exposed to the IT personnel during the process of service. Similarly, in many other software applications, there are opportunities for application content to be exposed to IT personnel even though there is no need-to-know for them to view such application content. This may create unnecessary information disclosure.

SUMMARY

Innovative aspects of the subject matter described in this specification may be embodied in a method of minimizing data exposure during screen sharing, including detecting remote access of an information handling system by an external information handling system; in response to detecting the remote access, identifying a selection of one or more application elements of an application executing on the information handling system for obscuration; applying an image filter to the selected application elements to adjust display properties of the selected application elements such that display content of the application elements is obscured for viewing by the external information handling system; and after applying the image filter to the selected application elements, providing remote access of the information handling system to the external information handling system, including providing remote access to the obscured display content of the selected application elements of the application.

Other embodiments of these aspects include corresponding systems, apparatus, and computer programs, configured to perform the actions of the methods, encoded on computer storage devices.

These and other embodiments may each optionally include one or more of the following features. For instance, in response to detecting the remote access, providing for display an user interface prompt indicating remote access by the external information handling system. Identifying the selection of the one or more application elements of the application executing on the information handling system for obscuration includes receiving user input indicating the selection of the application elements. Identifying the selection of the one or more application elements includes identifying child windows of a parent window of the application. Identifying the selection of the one or more application elements includes identifying display elements of a parent window of the application. Storing data indicating selected application elements for the application. After providing remote access to the obscured display content of the application elements of the application, including identifying a selection of one or more additional application elements of the application executing on the information handling system for obscuration; applying the image filter to the selected additional application elements to adjust display properties of the selected additional application elements such that display content of the additional application elements is obscured for viewing by the external information handling system; and after applying the image filter to the selected additional application elements, updating the remote access such that remote access is provided to the obscured display content of the selected additional application elements of the application. Determining that the remote access has concluded, and in response, removing the image filter to remove the obscuration of the display content of the selected application elements of the application.

Particular implementations of the subject matter described in this specification can be implemented so as to realize one or more of the following advantages. Implementations of the present disclosure provide screen sharing of an application at a client's information handling system while preventing user data exposure to an external information handling system remotely connected to the client's information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for minimizing data exposure during screen sharing. In short, a screen sharing management computing module can identify regions (or portions) of a graphical user interface (GUI) of a display for obscuring for view by a third party. Specifically, a user can launch an application for display on the GUI. The application can include application elements such as content that the user wishes to obscure for viewing when a third party has remote access to the information handling system. For example, the user can request IT support for help with an issue of the application. The IT support can request remote access to the information handling system to help fix the issue. However, the user wants to obscure from view portions of the application during such remote access that are not necessary to fix the issue (e.g., display content). For example, the application can include a word processing application, and the user can wish to obscure application elements related to content of the document of the word processing application, while providing remote access to other portions of the application such as tool bars and menus. The screen sharing management computing module can obscure from view such sensitive application elements from the external information handling system.

Specifically, this disclosure discusses a system and a method for minimizing data exposure during screen sharing, including detecting remote access of an information handling system by an external information handling system; in response to detecting the remote access, identifying a selection of one or more application elements of an application executing on the information handling system for obscuration; applying an image filter to the selected application elements to adjust display properties of the selected application elements such that display content of the application elements is obscured for viewing by the external information handling system; and after applying the image filter to the selected application elements, providing remote access of the information handling system to the external information handling system, including providing remote access to the obscured display content of the selected application elements of the application.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
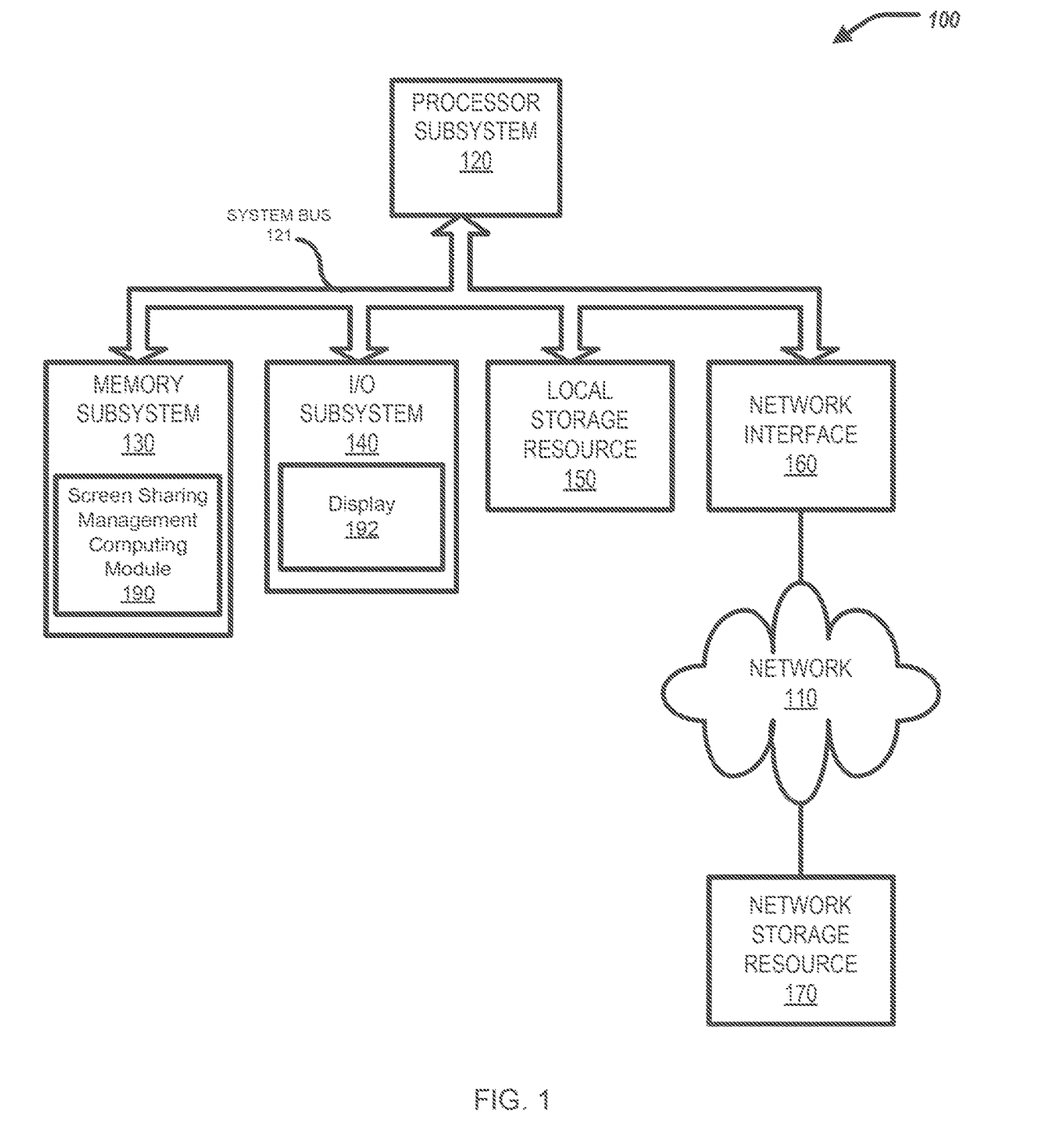
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. For example, the I/O subsystem 140 can include a display 192.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a screen sharing management computing module 190. The screen sharing management computing module 190 can be included by the memory subsystem 130. The screen sharing management computing module 190 can include a computer-executable program (software). The screen sharing management computing module 190 can be executed by the processor subsystem 120.

In short, the screen sharing management computing module 190 can identify regions (or portions) of a graphical user interface (GUI) of the display 192 for obscuring for view by a third party. Specifically, a user can launch an application for display on the GUI. The application can include application elements such as content that the user wishes to obscure for viewing when a third party has remote access to the information handling system 100. For example, the user can request IT support for help with an issue of the application. The IT support can request remote access to the information handling system 100 to help fix the issue. However, the user wants to obscure from view portions of the application during such remote access that are not necessary to fix the issue (e.g., display content). For example, the application can include a word processing application, and the user can wish to obscure application elements related to content of the document of the word processing application, while providing remote access to other portions of the application such as tool bars and menus. The screen sharing management computing module 190 can obscure from view such sensitive application elements from the external information handling system.

Figure 2:
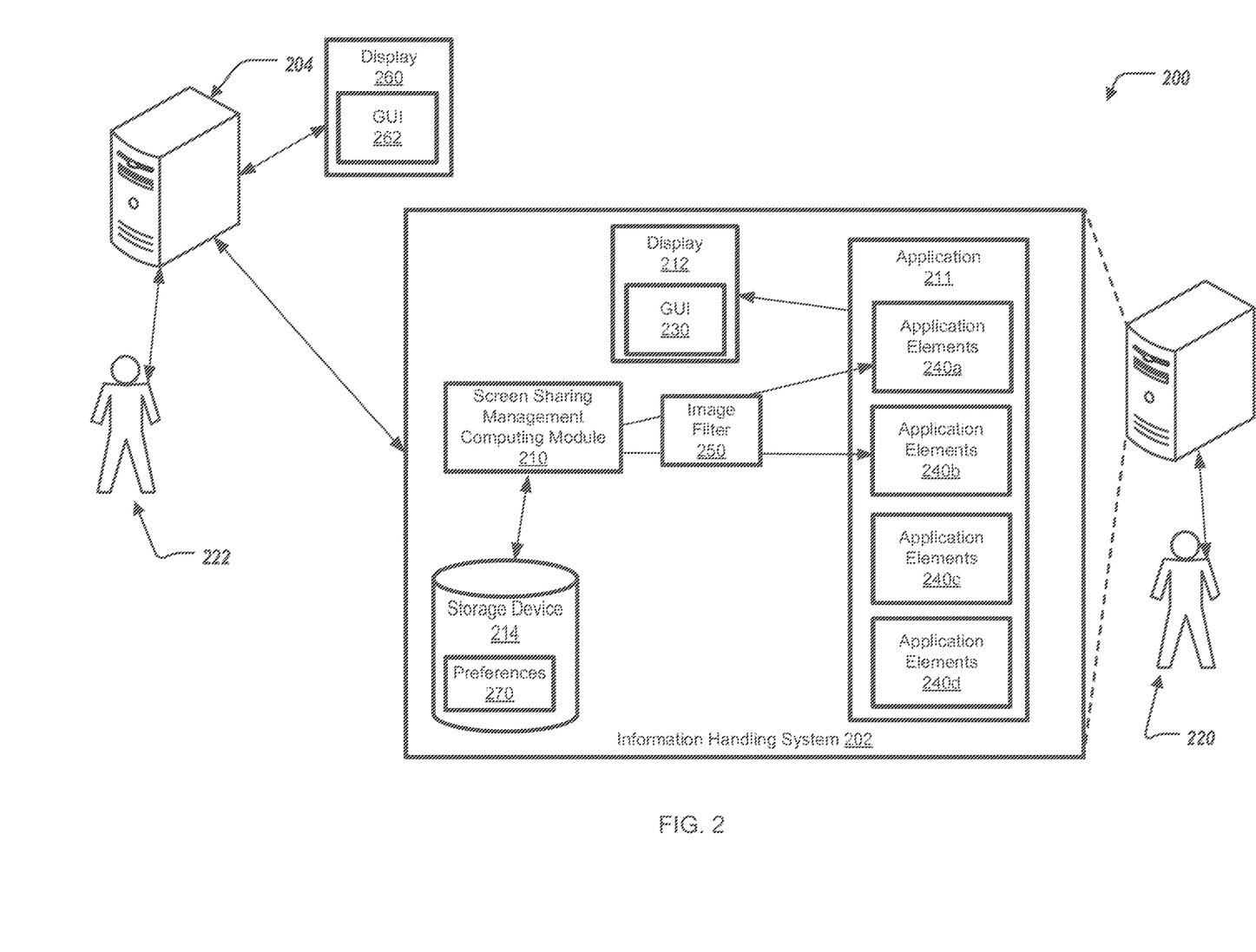
FIG. 2 illustrates a block diagram of an information handling system for minimizing data exposure during screen sharing.

Turning to FIG. 2, FIG. 2 illustrates an environment 200 including an information handling system 202 and an external information handling system 204. The information handling system 202 can include a screen sharing management computing module 210, an application 211, a display 212, and a storage device 214. In some examples, the information handling system 202 is similar to, or includes, the information handling system 100 of FIG. 1. In some examples, the screen sharing management computing 210 is the same, or substantially the same, as the screen sharing management module 190 of FIG. 1. In some examples, the display 212 is the same, or substantially the same, as the display 192 of FIG. 1.

The screen sharing management computing module 210 can be in communication with the application 211 and the storage device 214. The information handling system 202 can be in communication with the external information handling system 204 over one or more networks (e.g., the Internet).

The external information handling system 204 can include a display 260.

The screen sharing management computing module 210 can facilitate minimizing data exposure of the information handling system 202 and the application 211, during screen sharing with the external information handling system 204, described further herein.

In some implementations, the screen sharing management computing module 210 can detect remote access of the information handling system 202 by the external handling system 204. Specifically, a user 220 of the information handling system 202 can be experiencing issues/problems (technical issues/problems) while interacting with the application 211 that is executing on the information handling system 202 (executing by the information handling system 202). The display 212 can include a graphical user interface (GUI) 230 that displays a displayable portion of the application 211 (e.g., a portion of the application 211 that corresponds to being displayed). For example, the user 220 can request technical support from the "Information Technology" or IT department—e.g., the user 222. The information handling system 202 can provide remote access such that the user 222 can access the information handling system 202 through the external information handling system 204 to facilitate such technical support.

The screen sharing management computing module 210, in response to detecting the remote access by the external information handling system 204, can identify a selection of application elements of the application 210 for obscuration. That is, prior to a connection being established between the external information handling system 204 and the information handling system 202, the screen sharing management computing module 210 can identify displayed portions of the application 210 (application elements) for obscuration for viewing by the external information handling system 204 (and specifically, viewing by the user 222).

Specifically, in response to detecting the remote access by the external information handling system 204, the screen sharing management computing module 210 can provide for display on the GUI 230 of the display 212 an interface prompt (notification) indicating such attempted remote access by the external information handling system 204. The interface prompt (notification) can indicate to the user 220 that certain portions of the GUI 230 can be obscured for viewing by the user 222. That is, certain portions of the GUI 230, including portions of the application 211 that are displayed on the GUI 230, should be obscured for viewing by the user 222 to minimize or limit data exposure within such application 210 ("hide" content that is within a specific application—e.g., the application 211).

The application 211 can include application elements 240a, 240b, 240c (collectively referred to as application elements 240); however, the application 210 can include any number of application elements 240. In some examples, the application elements 240 can include child windows of a parent window of the application 210. In some examples, the application elements 240 can include display elements of a parent window of the application 210.

Figure 3A:
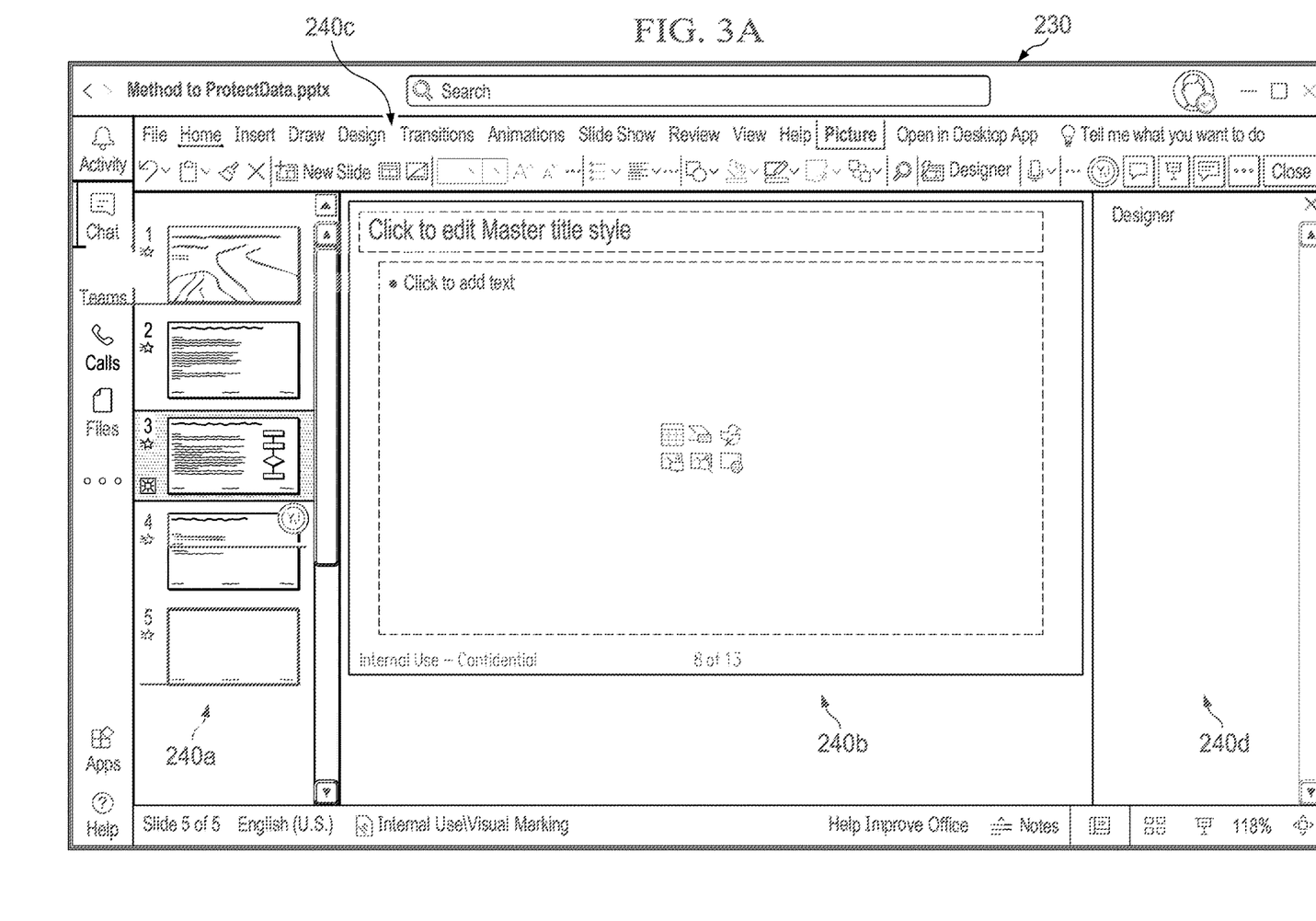
FIGS. 3A, 3B, 3C illustrate a display for screen sharing.

FIG. 3A illustrates an example of the GUI 230 displaying the application 210. In particular, the GUI 230 can include the application elements 240a, 240b, 240c, 240d. The application elements 240 can include display elements of the application 210. The applications elements 240 can include child windows (or sub-windows or window panes) of the application 210—such as application elements 240a, 240b, 240d. The application elements 240 can include non-child windows of the application 210, including menus, sub-menus, and tollbars of the application—such as application element 240c.

In some examples, the screen sharing management computing module 210 can provide an interface overlay on the GUI 230 indicating the application elements 240. That is, in response to detecting the remote access by the external information handling system 204, the screen sharing management computing module 210 can provide the interface overlay on the GUI 230 indicating the application elements 240.

Figure 3B:
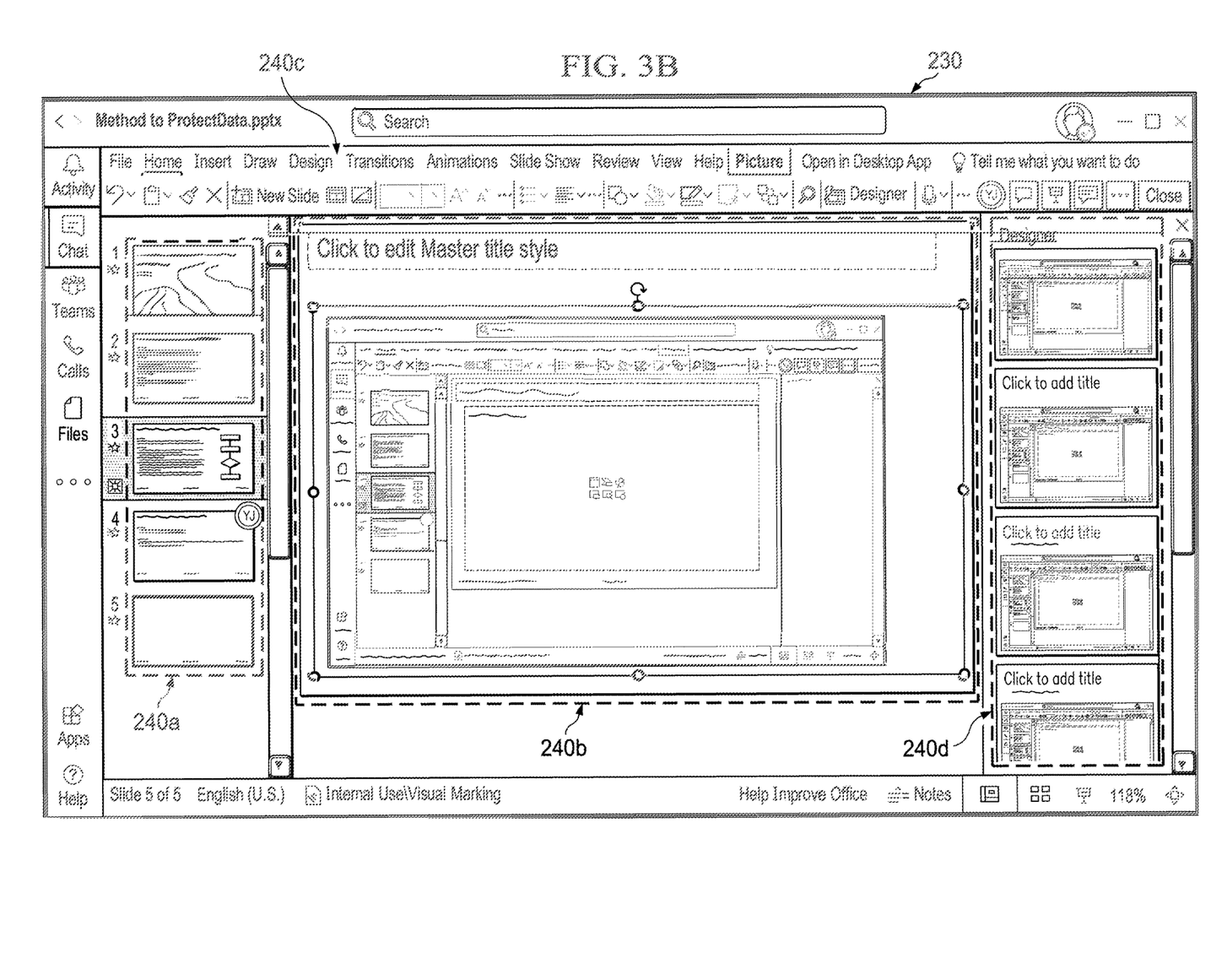

FIG. 3B illustrates the GUI 230 display the application 210 and the interface overlay indicating the application elements 240. For example, each of the application elements 240 can be indicated by a bounding box that outlines the application elements 240. In some examples, the bounding boxes that surround the application elements 240 can be of a different line thickness and/or line color as compared to other elements of the GUI 230 to visually indicate the application elements 240 to the user 220. As shown by the GUI 230, the application 210 can include application elements 240a, 240b, 240c, 240d.

In some examples, identifying the selection of the application elements 240 of the application 211 for obscuration can include receiving user input from the user 220 indicating the selection of the application elements 240 (a subset of the application elements 240). For example, the interface overlay provided on the GUI 230 that indicates the application elements 240 can be interacted with by the user 220. For example, the GUI 230 can provide menu options to allow the user 220 to pinpoint areas for obscuration by selecting such areas with a "mouse click"—e.g., the application elements 240a, 240b, 240d. The application elements 240 that the user 220 selects can include regions of the application 211 that are displayed by the GUI 230 (e.g., bounding boxes or window panes of the application 211 that is displayed by the GUI 230). For example, the user 220 can select the application elements 240a, 240b, 240d for obscuration by selecting the application elements 240a, 240b, 240d through a selectable GUI element on the GUI 230 (e.g. drop down menu) when the application elements 240a, 240b are selected; or by "hovering" over the application elements 240a, 240b, 240d with a UI element (e.g., mouse pointer) and selected the application elements 240a, 240b, 240d to indicate obscuration.

The screen sharing management computing module 210 can apply an image filter 250 to the selected application elements 240a, 240b, 240d to adjust display properties of the application elements 240a, 240b, 240d. Specifically, by applying the image filter 250 to the application elements 240a, 240b, 240d, display content of the application elements 240a, 240b, 240d is obscured for viewing by the user 222 at the external information handling system 204.

Figure 3C:
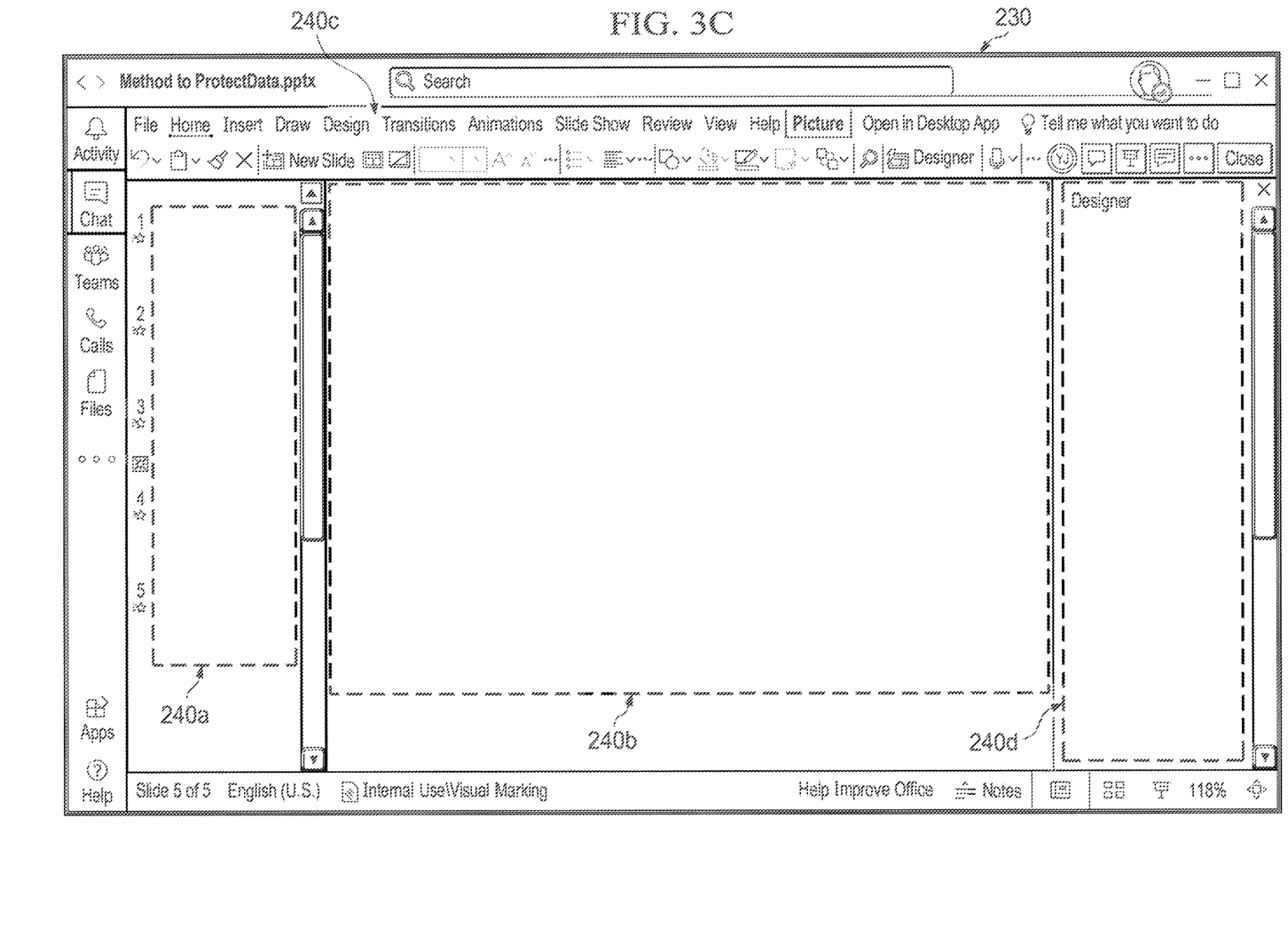

In some examples, the screen sharing management computing module 210 can apply the image filter 250 to the selected application elements 240a, 240b, 240d to adjust display properties of the application elements 240a, 240b, 240d such as applying a color overlay to the application elements 240a, 240b, 240d. That is, the screen sharing management computing module 210 can apply the image filter 250 to regions (or portions) of the GUI 230 displaying the application 211—e.g., child windows (sub-windows) of the application 211. For example, the color overlay can include a grey color overlay such that the display contents of the application elements 240a, 240b, 240d are obscured by the grey color overlay of the image filter 250. FIG. 3C illustrates the GUI 230 of the application 211 with the image filter 250 applied to the application elements 240a, 240b, 240d. Specifically, the screen sharing management computing module 210 applies the image filter 250 to the application elements 240a, 240b, 240d such that a gray color overlay obscures the display contents of the application elements 240a, 240b, 240d.

In some examples, the image filter 250 can include other image adjustments to obscure the display contents of the application elements 240a, 240b, 240d, such as a blurring filtering to blur the display contents of the application elements 240a, 240b, 240d. In some examples, the screen sharing management computing module 210 can apply an image filter 250 of a first type (e.g., gray color overlay) to the application element 240a; and apply an image filter 250 of a second type (e.g., blurring overlay) to the application element 240b.

In some examples, the screen sharing management computing module 210 can apply the image filter 250 to the selected application elements 240a, 240b, 240d such that the display contents of the application elements 240a, 240b, 240d are obscured at both the information handling system 202 and the external information handling system 204. In some examples, the screen sharing management computing module 210 can apply the image filter 250 to the selected application elements 240a, 240b, 240d such that the display contents of the application elements 240a, 240b, 240d are obscured at only the external information handling system 204. That is, at the information handling system 202, the display contents of the application elements 240a, 240b, 240d are not obscured (for viewing by the user 220) but are obscured for viewing at the external information handling system 204 (for viewing by the user 222).

The screen sharing management computing module 210 can, after applying the image filter 250 to the application elements 240, provide remote access to the information handling system 202 to the external information handling system 204. That is, the screen sharing management computing module 210 can provide remote access to the obscured display content of the application elements 240a, 240b, 240d of the application 211. For example, the user 222 can access the GUI 230 remotely through the external information handling system 204 such that a GUI 262 of the display 260 includes a representation of the GUI 230 with the application elements 240a, 240b, 240d including the obscured display content. For example, the GUI 262 of the display 260 can display the application elements 240a, 240b, 240d with a "greyed-out" color over the display content of the application elements 240a, 240b, 240d; and/or a blurring of the display content of the application elements 240a, 240b, 240d. Further, the GUI 262 can display the application element 240c with no obscured display content. For example, the user 222—e.g., the "IT department"—can remotely access the information handling system 202, and in particular, the application 211, with the GUI 230 being replicated at the GUI 262 with the display content of the application elements 240a, 240b, 240d being obscured; and further the application element 240c not being obscured.

In some examples, the screen sharing management computing module 210 can determine that remote access by the external information handling system 204 has concluded. That is, the user 222 is not accessing the GUI 262 that replicates the GUI 230 with the obscured application elements 240a, 240b, 240d. The connection between the external information handling system 204 and the internal information handling system 202 is disconnected, or severed. The screen sharing management computing module 210, in response, can remove the image filter 250 to remove the obscuration of the display content of the application elements 240a, 240b, 240d of the application 211. That is, the screen sharing management computing module 210 no longer applies the image filter 250. In some examples, the GUI 230 is updated to remove the image filter 250 from being applied such that the display content of the application elements 240a, 240b, 240d of the application 211 is no longer obscured.

In some examples, the screen sharing management computing module 210 can store data indicating the selection of the application elements 240a, 240b, 240d for the application 211. That is, the screen sharing management computing module 210 can store preferences 270 at the storage device 214 that indicate the selections of the application elements 240a, 240b, 240d for the application 211 for obscuration. Thus, when remote access is requested again for the application 211 at the information handling system 202, the screen sharing management computing module 210 can access the storage device 214 to identify the preferences 270. The screen sharing management computing module 210 can then apply the preferences 270 to the application 211 and the GUI 230 to automatically apply the image filter 250 to the application elements 240a, 240b, 240d to obscure the content of the applications elements 240a, 240b, 240d (without further user input).

In some examples, after providing remote access to the obscured display content of the application elements 240a, 240b, 240d of the application 211 to the external information handling system 204, the screen sharing management computing module 210 can obscure additional application elements. Specifically, the screen sharing management computing module 210 can identify a selection of additional application elements of the application 211 for obscuration. That is, after providing remote access to the obscured display content of the application elements 240a, 240b, 240d of the application 211 to the external information handling system 204, the screen sharing management computing module 210 can identify additional displayed portions of the application 211 (application elements) for obscuration for viewing by the external information handling system 204 (and specifically, by the user 222).

In some examples, the user 220 can identify additional application elements 240 of the application 211 of the existing GUI 230 (e.g., when the GUI 230 remains static—no additional application elements 240 are generated on the GUI 230 for the application 211). In some examples, the application 211 can update GUI 230 to include additional (new) application elements 240—that is, the GUI 230 is "redrawn" due to movement of the sub-windows (child windows), or when new sub-windows (child windows) are generated.

In some examples, when additional application elements 240 are presented in the GUI 230, the screen sharing management computing module 210 can provide for display on the GUI 230 of the display 212 an additional interface prompt (notification) indicating that additional application elements 240 (new application elements 240) are included by the GUI 230, and possibly viewing by the user 222 during the remote access. The interface prompt (notification) can indicate to the user 220 the (new) additional application elements 240 that can be obscured for viewing by the user 222, to minimize or limit data exposure of the content of the additional application elements ("hide" additional content that is within the specific application—e.g., the application 211).

In some examples, the screen sharing management computing module 210 can apply the image filter 250 to the selected additional application elements 240 such that the display content of the additional application elements are obscured at both the information handling system 202 and the external information handling system 204. In some examples, the screen sharing management computing module 210 can apply the image filter 250 to the selected additional application elements 240 such that the display contents of the additional application elements 240 are obscured at only the external information handling system 204. That is, at the information handling system 202, the display contents of the additional application elements 240 are not obscured (for viewing by the user 220) but are obscured for viewing at the external information handling system 204 (for viewing by the user 222).

The screen sharing management computing module 210 can, after applying the image filter 250 to the additional application elements 240, can update the remote access to the information handling system 202 to the external information handling system 204. That is, the screen sharing management computing module 210 can update the remote access to the obscured display content of the additional application elements 240 of the application 211. For example, the GUI 262 of the display 260 can be updated such that display of the additional application elements 240 with a "greyed-out" color over the display content of the additional application elements 240; and/or a blurring of the display content of the additional application elements 240.

In some examples, previously obscured application elements 240 can be un-obscured. That is, the user 220 can provide user input selecting one or more of the application elements 240 that previously had the image filter 250 applied thereto to obscure the content of the application elements 240. The screens haring management computing module 210 can remove application of the image filter 250 to such application elements 250 such that the display contents of the application element 250 are restored to a previous state (e.g., unadjusted, or unfiltered).

Figure 4:
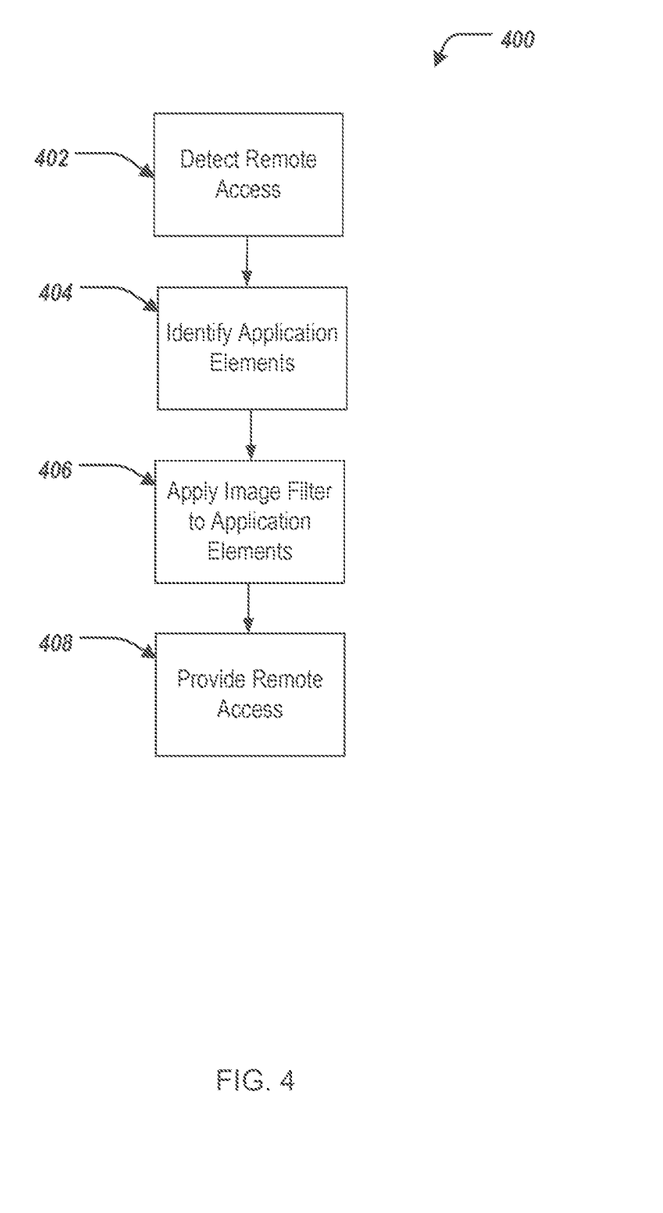
FIG. 4 illustrates a method for minimizing data exposure during screen sharing.

FIG. 4 illustrates a flowchart depicting selected elements of an embodiment of a method 400 for minimizing data exposure during screen sharing. The method 400 may be performed by the information handling system 100, the information handling system 202 and/or the screen sharing management computing module 210, and with reference to FIGS. 1-3. It is noted that certain operations described in method 400 may be optional or may be rearranged in different embodiments.

The screen sharing management computing module 210 detects remote access of the information handling system 202 by the external information handling system 204 (402). The screen sharing management computing module 210, in response to detecting the remote access, identifies a selection of one or more application elements 240 of the application 211 executing on the information handling system 202 for obscuration (404). The screen sharing management computing module 210 applies the image filter 250 to the selected application elements 240 to adjust display properties of the selected application elements 240 such that display content of the application elements 240 is obscured for viewing by the external information handling system 204 (406). The screen sharing management computing module 210, after applying the image filter 250 to the selected application elements 240, provides remote access of the information handling system 202 to the external information handling system 204, including providing remote access to the obscured display content of the selected application elements 240 of the application 211 (408).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of minimizing data exposure during screen sharing, the method comprising:
   detecting, at a first time, remote access of an information handling system by an external information handling system;
   in response to detecting the remote access, identifying a selection of one or more application elements of an application executing on the information handling system for obscuration;
   applying an image filter to the selected application elements to adjust display properties of the selected application elements such that display content of the application elements is obscured for viewing by the external information handling system;
   storing, at a storage device, preference data indicating the selected application elements for the application;

after applying the image filter to the selected application elements, providing remote access of the information handling system to the external information handling system, including providing remote access to the obscured display content of the selected application elements of the application;

detecting, at a second time after the first time, additional remote access of the information handling system by the external information handling system;

in response to detecting the additional remote access:
  accessing the storage device to identify the preference data; and
  applying the preference data to the application to automatically apply the image filter to the selected application elements indicated by the preference data to adjust display properties of the selected application elements such that display content of the application elements is obscured for viewing by the external information handling system.

2. The computer-implemented method of claim 1, further comprising in response to detecting the remote access, providing for display an user interface prompt indicating remote access by the external information handling system.

3. The computer-implemented method of claim 1, wherein identifying the selection of the one or more application elements of the application executing on the information handling system for obscuration includes receiving user input indicating the selection of the application elements.

4. The computer-implemented method of claim 1, wherein identifying the selection of the one or more application elements includes identifying child windows of a parent window of the application.

5. The computer-implemented method of claim 1, wherein identifying the selection of the one or more application elements includes identifying display elements of a parent window of the application.

6. The computer-implemented method of claim 1, after providing remote access to the obscured display content of the application elements of the application, the method further comprising:
  identifying a selection of one or more additional application elements of the application executing on the information handling system for obscuration;
  applying the image filter to the selected additional application elements to adjust display properties of the selected additional application elements such that display content of the additional application elements is obscured for viewing by the external information handling system; and
  after applying the image filter to the selected additional application elements, updating the remote access such that remote access is provided to the obscured display content of the selected additional application elements of the application.

7. The computer-implemented method of claim 1, further comprising:
  determining that the remote access has concluded, and in response, removing the image filter to remove the obscuration of the display content of the selected application elements of the application.

8. An information handling system comprising a processor having access to memory media storing instructions executable by the processor to perform operations, comprising:

detecting, at a first time, remote access of the information handling system by an external information handling system;

in response to detecting the remote access, identifying a selection of one or more application elements of an application executing on the information handling system for obscuration;

applying an image filter to the selected application elements to adjust display properties of the selected application elements such that display content of the application elements is obscured for viewing by the external information handling system;

storing, at a storage device, preference data indicating the selected application elements for the application;

after applying the image filter to the selected application elements, providing remote access of the information handling system to the external information handling system, including providing remote access to the obscured display content of the selected application elements of the application;

detecting, at a second time after the first time, additional remote access of the information handling system by the external information handling system;

in response to detecting the additional remote access:
  accessing the storage device to identify the preference data; and
  applying the preference data to the application to automatically apply the image filter to the selected application elements indicated by the preference data to adjust display properties of the selected application elements such that display content of the application elements is obscured for viewing by the external information handling system.

9. The information handling system of claim 8, the operations further comprising in response to detecting the remote access, providing for display an user interface prompt indicating remote access by the external information handling system.

10. The information handling system of claim 8, wherein identifying the selection of the one or more application elements of the application executing on the information handling system for obscuration includes receiving user input indicating the selection of the application elements.

11. The information handling system of claim 8, wherein identifying the selection of the one or more application elements includes identifying child windows of a parent window of the application.

12. The information handling system of claim 8, wherein identifying the selection of the one or more application elements includes identifying display elements of a parent window of the application.

13. The information handling system of claim 8, after providing remote access to the obscured display content of the application elements of the application, the operations further comprising:
  identifying a selection of one or more additional application elements of the application executing on the information handling system for obscuration;
  applying the image filter to the selected additional application elements to adjust display properties of the selected additional application elements such that display content of the additional application elements is obscured for viewing by the external information handling system; and
  after applying the image filter to the selected additional application elements, updating the remote access such that remote access is provided to the obscured display content of the selected additional application elements of the application.

14. The information handling system of claim 8, further comprising:

determining that the remote access has concluded, and in response, removing the image filter to remove the obscuration of the display content of the selected application elements of the application.

15. A non-transitory computer-readable medium storing software comprising instructions executable by one or more computers which, upon such execution, cause the one or more computers to perform operations comprising:

detecting, at a first time, remote access of an information handling system by an external information handling system;

in response to detecting the remote access, identifying a selection of one or more application elements of an application executing on the information handling system for obscuration;

applying an image filter to the selected application elements to adjust display properties of the selected application elements such that display content of the application elements is obscured for viewing by the external information handling system;

storing, at a storage device, preference data indicating the selected application elements for the application;

after applying the image filter to the selected application elements, providing remote access of the information handling system to the external information handling system, including providing remote access to the obscured display content of the selected application elements of the application;

detecting, at a second time after the first time, additional remote access of the information handling system by the external information handling system;

in response to detecting the additional remote access:
accessing the storage device to identify the preference data; and
applying the preference data to the application to automatically apply the image filter to the selected application elements indicated by the preference data to adjust display properties of the selected application elements such that display content of the application elements is obscured for viewing by the external information handling system.

16. The non-transitory computer-readable medium of claim 15, the operations further comprising in response to detecting the remote access, providing for display an user interface prompt indicating remote access by the external information handling system.

17. The non-transitory computer-readable medium of claim 15, wherein identifying the selection of the one or more application elements of the application executing on the information handling system for obscuration includes receiving user input indicating the selection of the application elements.

18. The non-transitory computer-readable medium of claim 15, wherein identifying the selection of the one or more application elements includes identifying child windows of a parent window of the application.

* * * * *